(12) United States Patent
Ogawa et al.

(10) Patent No.: US 12,281,672 B2
(45) Date of Patent: Apr. 22, 2025

(54) OPENING/CLOSING DEVICE

(71) Applicants: Kabushiki Kaisha Toshiba, Tokyo (JP); Toshiba Energy Systems & Solutions Corporation, Kawasaki Kanagawa (JP)

(72) Inventors: Satoi Ogawa, Ota Tokyo (JP); Satoshi Marushima, Kawasaki Kanagawa (JP); Yoshiaki Ohda, Yokohama Kanagawa (JP); Tooru Inoue, Yokohama Kanagawa (JP); Tomohiro Hasegawa, Kawasaki Kanagawa (JP); Norimitsu Kato, Yokohama Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 190 days.

(21) Appl. No.: 18/149,634

(22) Filed: Jan. 3, 2023

(65) Prior Publication Data

US 2023/0160416 A1 May 25, 2023

Related U.S. Application Data

(63) Continuation of application No. PCT/JP2020/031764, filed on Aug. 24, 2020.

(51) Int. Cl.
*F16C 3/12* (2006.01)
*F16F 15/129* (2006.01)

(52) U.S. Cl.
CPC ............ *F16C 3/12* (2013.01); *F16F 15/1297* (2013.01)

(58) Field of Classification Search
CPC ........ F16C 3/12; F16F 15/1297; F16F 13/007; H01H 3/60; H01H 3/46; H01H 33/42; H01H 2033/426; H02B 13/0354
(Continued)

(56) References Cited

U.S. PATENT DOCUMENTS 5,510,590 A * 4/1996 Hux .................. H01H 9/563
218/7
5,594,223 A * 1/1997 Fukushi ............ H01H 9/0038
218/120
(Continued)

FOREIGN PATENT DOCUMENTS

JP S55-77319 U 5/1980
JP S58-102423 A 6/1983
(Continued)

*Primary Examiner* — William A Bolton
(74) *Attorney, Agent, or Firm* — Finnegan, Henderson, Farabow, Garrett & Dunner, LLP

(57) ABSTRACT

An opening/closing device of an embodiment has first to third movable contacts, first to third transmission mechanisms, first to third containers, a crankshaft, an operating mechanism, and a shock absorbing mechanism. The first to third movable contacts are accommodated in the first to third containers. The first to third transmission mechanisms are connected to the first to third movable contacts. The first to third containers accommodate at least the first movable contact. The crankshaft operates the first to third transmission mechanisms and changes the first to third movable contacts from a closed state to an open state. The operating mechanism is disposed on the side of the first transmission mechanism to rotate the crankshaft. The shock absorbing mechanism is disposed on the side of the third transmission mechanism to absorb a shock of rotational movement of the crankshaft.

10 Claims, 8 Drawing Sheets

(58) Field of Classification Search
USPC ......... 218/1, 4, 7, 10, 12, 13, 119, 120, 140, 218/153, 154; 200/16 R, 50.01, 50.34; 267/140.13, 168, 290, 291, 64.12
See application file for complete search history.

(56) References Cited

U.S. PATENT DOCUMENTS

| | | | | |
|---|---|---|---|---|
| 6,313,424 B1 * | 11/2001 | Bachofen | ............... | H01H 9/563 200/337 |
| 6,628,494 B2 * | 9/2003 | Opfer | ............... | H01H 33/42 361/115 |
| 6,759,617 B2 * | 7/2004 | Yoon | ............... | H01H 33/666 218/120 |
| 9,082,561 B2 * | 7/2015 | Reuber | ............... | H01H 3/42 |
| 2010/0012624 A1 * | 1/2010 | Akesson | ............... | H01H 33/121 218/154 |
| 2010/0014218 A1 * | 1/2010 | Mori | ............... | H01H 33/42 361/619 |

FOREIGN PATENT DOCUMENTS

| | | |
|---|---|---|
| JP | S60-5462 Y2 | 2/1985 |
| JP | 11-53998 A | 2/1999 |
| JP | 2018-129120 A | 8/2018 |

* cited by examiner

OPENING/CLOSING DEVICE

CROSS-REFERENCE TO RELATED APPLICATIONS

The present application is a continuation patent application of International Application No. PCT/JP2020/031764, filed Aug. 24, 2020, the content of which is incorporated herein by reference. The PCT International Application was published in the Japanese language.

FIELD

An embodiment of the present invention relates to an opening/closing device.

BACKGROUND

In the related art, an opening/closing device is known which has a structure in which movable contacts provided for each of three phases are moved by one driving device via one shaft. For example, the shaft is constituted by a plurality of parts and provided with joints. In particular, an insulating material is used in a joint portion to prevent current from flowing. In addition, for the purpose of improving transmission efficiency and reducing the number of parts, a structure is also disclosed in which the shafts are connected as a spline to tightly transmit a torque associated with rotational movement.

When the opening/closing device is opened, if the shaft is rotated to move the movable contacts of each phase with a single shaft, the shaft is twisted, different delays occur between the movable contacts for each phase, and deviation in movement of the contacts may occur. Then, when the shaft is braked to stop an operation of the movable contacts for each phase, among three phases, while the movable contacts of a first phase close to an operating mechanism rapidly decelerate according to braking of the operating mechanism, the movable contacts of a second phase and a third phase far from the operating mechanism continuously move due to inertia, and the deceleration may be delayed. As a result, although the movable contacts of the first phase reach the open position and stop, the movable contacts of the second phase and the third phase exceed the open position and may bounce back.

DETAILED DESCRIPTION

Hereinafter, an opening/closing device of an embodiment will be described with reference to the accompanying drawings. An opening/closing device of an embodiment has a first movable contact, a first transmission mechanism, a first container, a second movable contact, a second transmission mechanism, a second container, a third movable contact, a third transmission mechanism, a third container, a crankshaft, an operating mechanism, and a shock absorbing mechanism. The first movable contact is accommodated in the first container. The first transmission mechanism is connected to the first movable contact. The first container accommodates at least the first movable contact. The second movable contact is accommodated in the second container. The second transmission mechanism is connected to the second movable contact. The second container accommodates at least the second movable contact and is aligned with the first container. The third movable contact is accommodated in the third container. The third transmission mechanism is connected to the third movable contact. The third container accommodates at least the third movable contact and is aligned with the second container. The crankshaft operates the first transmission mechanism, the second transmission mechanism, and the third transmission mechanism to change the first movable contact, the second movable contact, and the third movable contact from a closed state to an open state. The operating mechanism is disposed on the side of the first transmission mechanism and rotates the crankshaft. The shock absorbing mechanism is disposed on the side of the third transmission mechanism and absorbs a shock of rotational movement of the crankshaft.

In the application, a Z direction, an X direction, and a Y direction of an orthogonal coordinate system are defined as follows. The Z direction is a vertical direction, and a +Z direction is an upward direction. The X direction is a horizontal direction, and this is defined as a leftward/rightward direction of the opening/closing device. A +X direction is a rightward direction of the opening/closing device. The Y direction is a horizontal direction and a direction perpendicular to the X direction, and this is defined as a forward/rearward direction of the opening/closing device. A +Y direction is a forward direction. Further, terms such as "forward" and the like in this specification are expressed in terms of one direction when seen from the opening/closing device for the convenience of description.

First Embodiment

Figure 1:
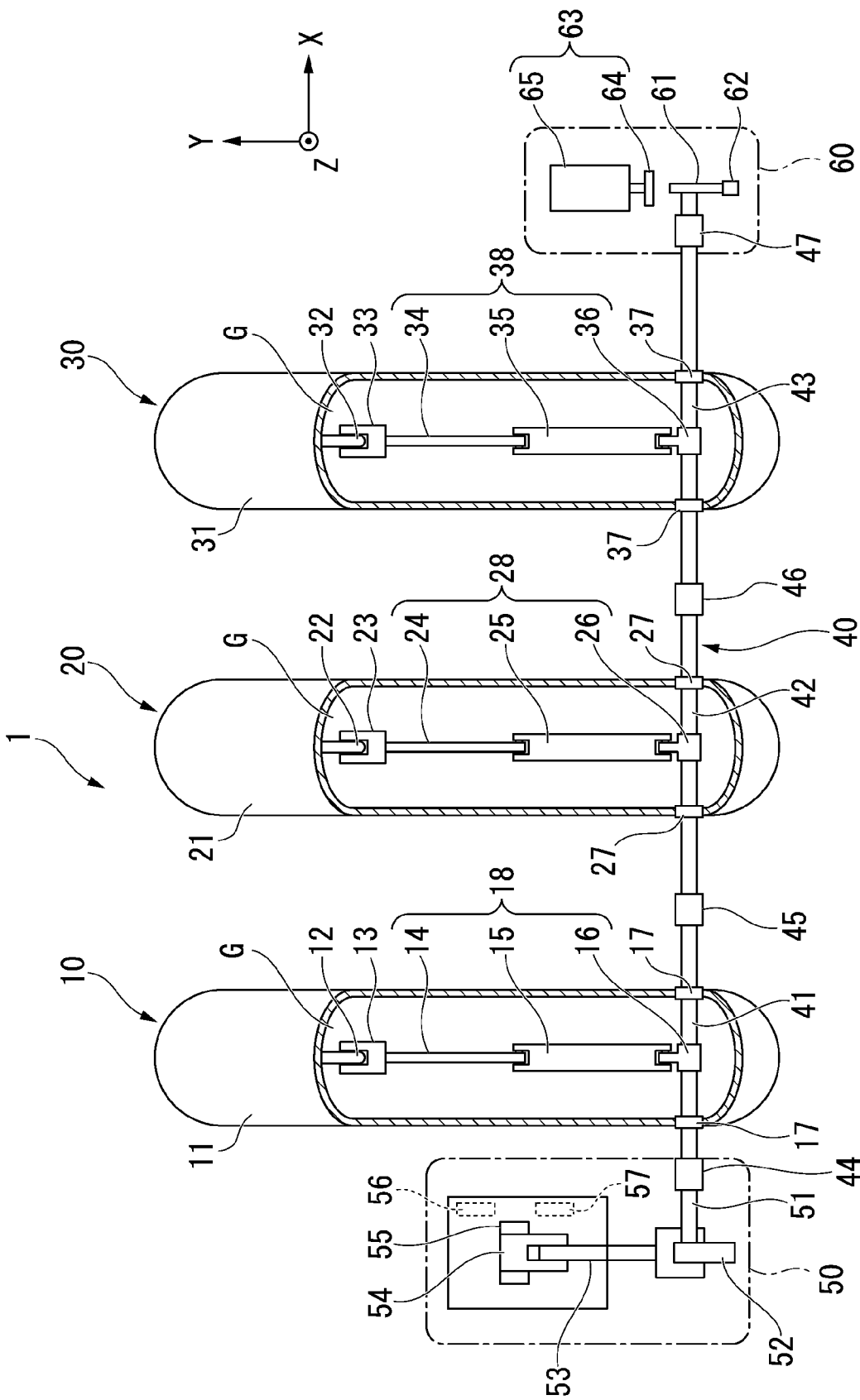
FIG. 1 is a view showing an outline of an opening/closing device of a first embodiment.
Figure 2:
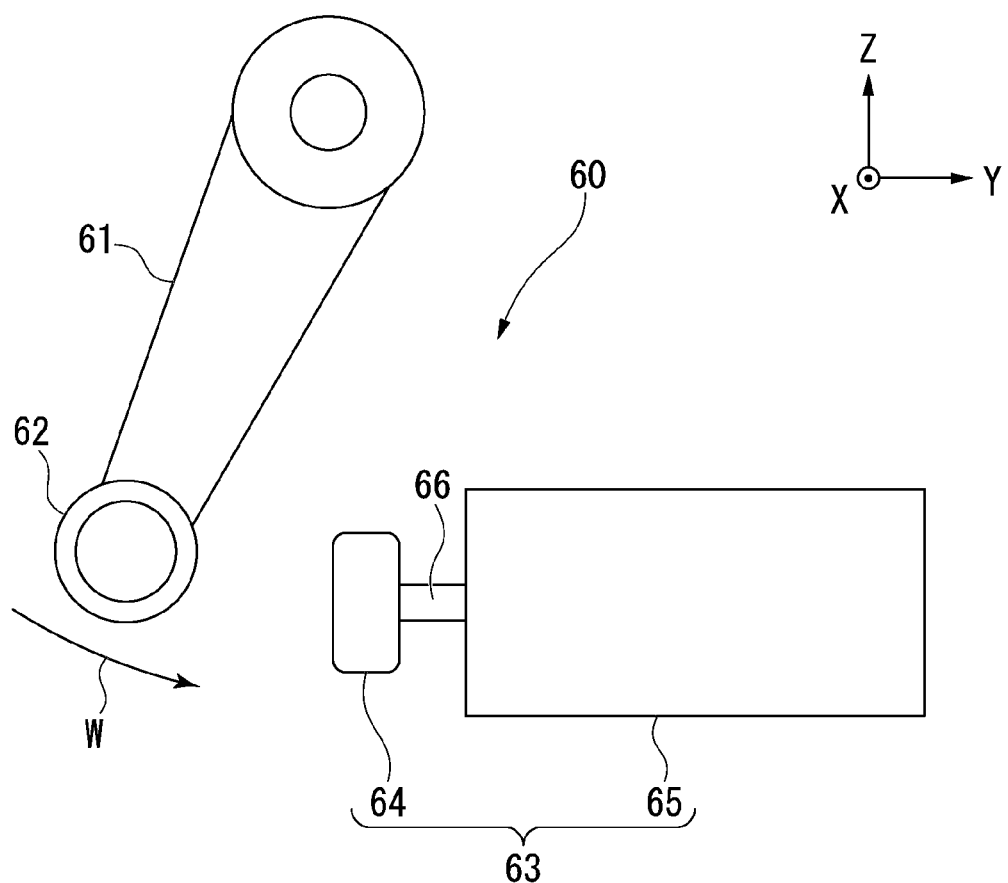
FIG. 2 is a view showing an outline of an auxiliary shock absorbing mechanism.

First, an opening/closing device of a first embodiment will be described. FIG. 1 is a view showing an outline of an opening/closing device 1 of the first embodiment, and FIG. 2 is a view showing an outline of an auxiliary shock absorbing mechanism 60. FIG. 1 shows the opening/closing device 1 in a plan view. The opening/closing device 1 includes, for example, a first phase 10, a second phase 20, a third phase 30, a crankshaft 40, an operating mechanism 50, and the auxiliary shock absorbing mechanism 60.

The first phase 10 includes, for example, a first container 11, a first facing contact 12, a first movable contact 13, a first operating rod 14, a first insulating operating rod 15, a first crank lever 16, and a first seal member 17. An insulating medium G is sealed in the first container 11, isolated from the external atmosphere, and hermetically sealed. The first container 11 is a hollow container elongated in the Y direction. The first facing contact 12, the first movable contact 13, the first operating rod 14, the first insulating operating rod 15, and the first crank lever 16 are received in the first container 11. A through-hole is formed at a position in the vicinity of one end portion of the first container 11 in the longitudinal direction, and the first seal member 17 is attached to the through-hole. A first transmission mechanism 18 is constituted by the first operating rod 14, the first insulating operating rod 15, and the first crank lever 16.

The first facing contact 12 is provided inside the first container 11 and fixed to the other end side of the first container 11 in the longitudinal direction. The first facing contact 12 protrudes toward one end (in the −Y direction) of the first container 11 in the longitudinal direction.

The first movable contact 13 has a concave shape that opens in the other end direction (+Y direction) of the first container 11, and a cross section of an opening portion thereof is an O type. An opening width of a concave portion of the first movable contact 13 (an opening width in the X direction) is substantially the same as a width of the first facing contact 12 (a width in the X direction). For example, when the first movable contact 13 moves in the other end direction of the first container 11, the first facing contact 12 and the first movable contact 13 come into contact with each other, and the first movable contact is closed. When the first movable contact 13 moves toward one end portion of the first container 11, the first facing contact 12 and the first movable contact 13 are separated from each other, and the first movable contact 13 is opened.

The first movable contact 13 is provided integrally with the first operating rod 14 and connected to the first operating rod 14 in the other end portion of the first operating rod 14. The first operating rod 14 is an elongated member in the longitudinal direction of the first container 11. For example, the first operating rod 14 is supported on both end portions by bearings (not shown) and moves linearly in the longitudinal direction of the first container 11.

The other end portion of the first insulating operating rod 15 is connected to one end portion of the first operating rod 14 through pin coupling. The first operating rod 14 is rotatable relative to the first insulating operating rod 15. The first crank lever 16 is connected to one end portion of the first insulating operating rod 15 through pin coupling. One end portion of the first insulating operating rod 15 rotates around the pin connecting the first insulating operating rod 15 and the first crank lever 16 according to rotation of the first crank lever 16. The first insulating operating rod 15 converts rotational movement of the first crank lever 16 into movement (linear movement) of the first operating rod 14.

The first crank lever 16 is fitted and connected to the crankshaft 40, and rotates according to rotation of the crankshaft 40. The crankshaft 40 passes through a through-hole provided in the first container 11. The first seal member 17 provided in the through-hole closes the through-hole through which the crankshaft 40 passes, and maintains airtightness in the first container 11. The crankshaft 40 is supported by bearings such as ball bearings or the like (not shown) and rotates freely.

The second phase 20 includes, for example, a second container 21, a second facing contact 22, a second movable contact 23, a second operating rod 24, a second insulating operating rod 25, a second crank lever 26, and a second seal member 27. The third phase 30 includes, for example, a third container 31, a third facing contact 32, a third movable contact 33, a third operating rod 34, a third insulating operating rod 35, a third crank lever 36, and a third seal member 37. Both the second phase 20 and the third phase 30 have the same configuration as the first phase 10. The second container 21 is aligned with the first container 11, and the third container 31 is aligned with the second container 21. A second transmission mechanism 28 is constituted by the second operating rod 24, the second insulating operating rod 25, and the second crank lever 26, and a third transmission mechanism 38 is constituted by the third operating rod 34, the third insulating operating rod 35, and the third crank lever 36.

Figure 8:
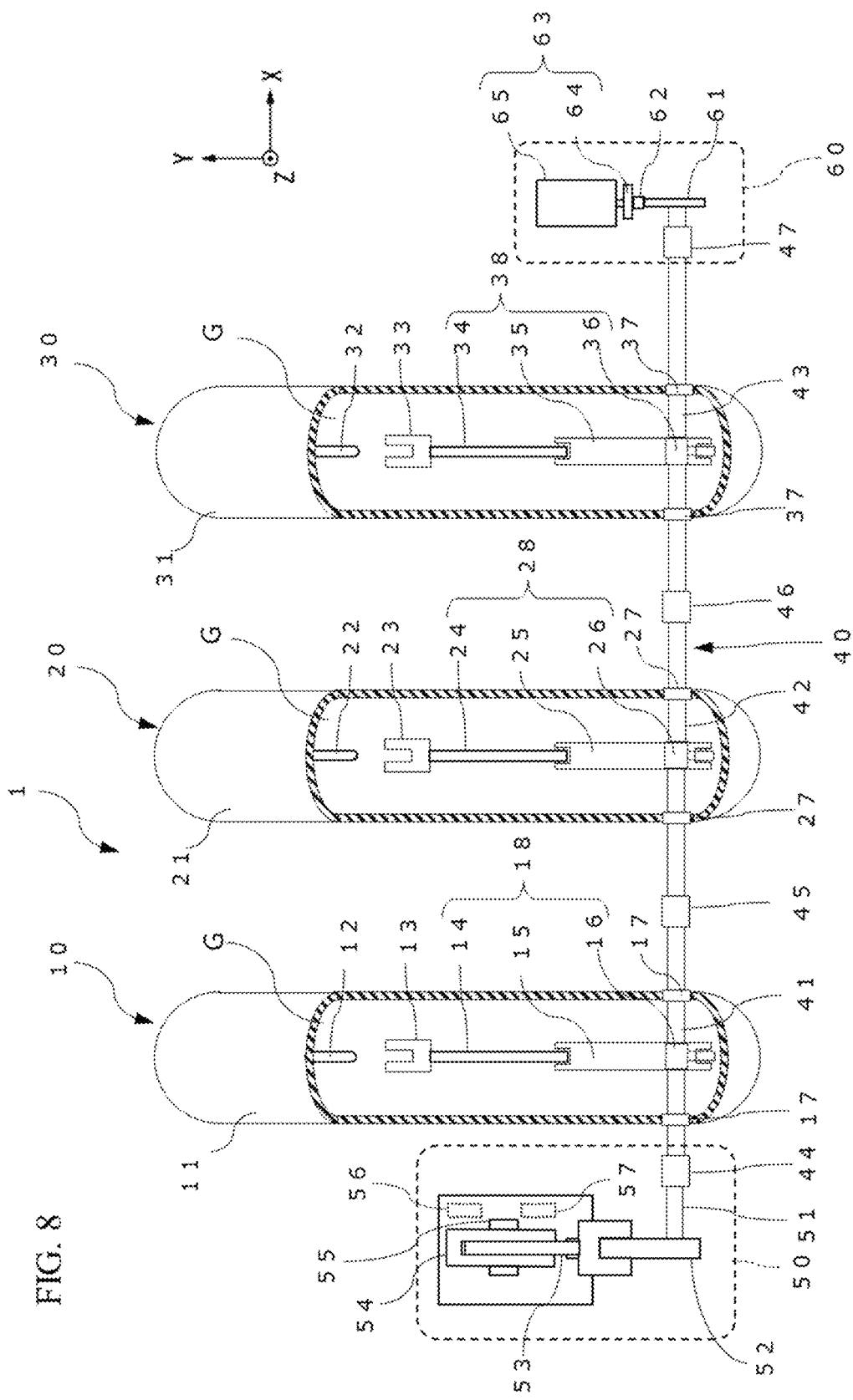
FIG. 8 is a view showing an outline of the opening/closing device of the first embodiment in an open state.

The crankshaft 40 includes, for example, a first crank connecting rod 41, a second crank connecting rod 42, a third crank connecting rod 43, an operating-mechanism-side coupling 44, a first coupling 45, a second coupling 46, and a shock-absorbing-mechanism-side coupling 47. The crankshaft 40 operates the first transmission mechanism 18, the second transmission mechanism 28, and the third transmission mechanism 38 to change the first movable contact 13, the second movable contact 23, and the third movable contact 33 between a closed state (as shown in FIG. 1) and an open state (as shown in FIG. 8). The first crank connecting rod 41, the second crank connecting rod 42, and the third crank connecting rod 43 are provided to correspond to the first movable contact 13, the second movable contact 23, and the third movable contact 33. The first crank connecting rod 41, the second crank connecting rod 42, and the third crank connecting rod 43 are all elongated members and have substantially the same diameter.

The first crank connecting rod 41 passes through the first container 11, the second crank connecting rod 42 passes through the second container 21, and the third crank connecting rod 43 passes through the third container 31. The first crank lever 16 is fitted into a longitudinal central portion of the first crank connecting rod 41, the second crank lever 26 is fitted into a longitudinal central portion of the second crank connecting rod 42, and the third crank lever 36 is fitted into a longitudinal central portion of the third crank connecting rod 43.

The operating-mechanism-side coupling 44 is attached to one end side of the first crank connecting rod 41 in a rotation axis direction. The second crank connecting rod 42 approaches the other end side of the first crank connecting rod 41. The other end side of the first crank connecting rod 41 and the one end side of the second crank connecting rod 42 are coupled to each other by the first coupling 45. The third crank connecting rod 43 approaches the other end side of the second crank connecting rod 42 in the rotation axis direction. The other end side of the second crank connecting rod 42 and the one end side of the third crank connecting rod 43 are coupled to each other by the second coupling 46. The shock-absorbing-mechanism-side coupling 47 is attached to the other end side of the third crank connecting rod 43.

The operating mechanism 50 is provided in the vicinity of one end side of the crankshaft 40. The operating mechanism 50 includes, for example, a rotation shaft 51, an operating mechanism crank lever 52, an intermediate rod 53, an intermediate lever 54, a connecting link 55, a built-in spring 56, and a shock absorber 57. The operating mechanism 50 is disposed on the side of the first transmission mechanism 18, and rotates the crankshaft 40.

The rotation shaft 51 is coaxial with the crankshaft 40 and coupled to one end side of the first crank connecting rod 41 via the operating-mechanism-side coupling 44. The rotation shaft 51 is attached to the operating mechanism crank lever 52. The operating mechanism crank lever 52 performs rotational movement around the same axis as the rotation shaft 51. The operating mechanism crank lever 52 is coupled to the intermediate rod 53 by a pin. The intermediate rod 53 is an elongated member, and has a movable range in which it can reciprocally move in the longitudinal direction. The intermediate rod 53 rotates the operating mechanism crank lever 52 and the rotation shaft 51 using reciprocal movement in the longitudinal direction.

The intermediate lever 54 is connected to the intermediate rod 53. The intermediate lever 54 has a rotation range corresponding to the movable range by the reciprocal movement of the intermediate rod 53 and around an axis parallel to the rotation shaft 51.

The connecting link 55 includes two plate-shaped members. The connecting link 55 is connected to the connecting link 55 with the intermediate lever 54 sandwiched between the plate-shaped members. The connecting link 55 is connected to the intermediate lever 54 with a movable range of reciprocal movement in the upward/downward direction (Z direction) with respect to rotational movement of the intermediate lever 54.

The built-in spring 56 applies a biasing force to the connecting link 55 and supplies power to the crankshaft 40 via the connecting link 55, the intermediate lever 54, the intermediate rod 53, the operating mechanism crank lever 52, and the rotation shaft 51. When the biasing force of the built-in spring 56 is normally suppressed and an operating command of the opening/closing device 1 is output by a control device (not shown), the biasing force of the built-in spring 56 is released and applied to the connecting link 55. The biasing force applied to the connecting link 55 is transmitted to the operating mechanism crank lever 52 via the intermediate lever 54, and the intermediate rod 53, the operating mechanism crank lever 52 and the rotation shaft 51 are rotated to rotate the crankshaft 40 according to rotation of the rotation shaft 51. The biasing force applied by the built-in spring 56 is transmitted to the crankshaft 40 as power for rotating the crankshaft 40. The built-in spring 56 is an example of a power source.

The shock absorber 57 starts to brake the rotating operation of the crankshaft 40 via the rotation shaft 51, for example, when the first movable contact 13, the second movable contact 23, or the third movable contact 33 reaches a position where braking is started by the shock absorber 57 (hereinafter, "a braking start position"). The braking start position will be described below.

The auxiliary shock absorbing mechanism 60 is provided in the vicinity of the other end side of the crankshaft 40. The auxiliary shock absorbing mechanism 60 includes, for example, a shock absorbing mechanism crank lever 61, a damper roller 62, and a damper 63. The damper 63 includes a damper head 64, a damper cylinder 65, and a damper piston 66. The auxiliary shock absorbing mechanism 60 is disposed on the side of the third transmission mechanism 38 and absorbs a shock of the rotational movement of the crankshaft. The auxiliary shock absorbing mechanism 60 is an example of the shock absorbing mechanism.

The shock absorbing mechanism crank lever 61 is coupled to the other end side of the third crank connecting rod 43 via the shock-absorbing-mechanism-side coupling 47. A rotation axis of the shock absorbing mechanism crank lever 61 is coaxial with the crankshaft 40, and a rotating direction of the shock absorbing mechanism crank lever 61 is the same as the rotating direction of the crankshaft 40.

The damper roller 62 is attached to the other end side tip portion of the shock absorbing mechanism crank lever 61. When the crankshaft 40 rotates, the shock absorbing mechanism crank lever 61 transmits rotation of the crankshaft 40 to the damper roller 62. The damper roller 62 rotates and moves in a rotating direction W around the crankshaft 40 according to rotation of the crankshaft 40. The damper roller 62 is an example of the roller member.

The damper 63 is disposed on a side of the third phase 30. The damper 63 is a so-called oil damper, oil is sealed in an internal space of the damper cylinder 65 in the damper 63, and the damper piston 66 is provided. The damper head 64 is disposed within the movable range of the shock absorbing mechanism crank lever 61. The damper head 64 is integrated with the damper piston 66, and reciprocal movement of the damper head 64 is transmitted as movement of the damper piston 66 therein. The damper head 64 of the damper 63 is engaged with (contacts) the damper roller 62, and energy from rotational movement of the crankshaft 40 is absorbed by the damper cylinder 65. The damper 63 is an example of the shock absorbing member.

Next, an opening operation of the opening/closing device 1 of the first embodiment will be described. The opening/closing device 1 finally separates the first movable contact 13 from the first facing contact 12 in the first container 11 by performing the opening operation. Likewise, in the second container 21 and the third container 31, the second movable contact 23 and the third movable contact 33 are separated from the second facing contact 22 and the third facing contact 32, respectively.

In the operating mechanism 50, the connecting link 55 is operated by the biasing force of the built-in spring 56. The connecting link 55 moves in the upward/downward direction (Z direction). The intermediate lever 54 is rotated and moved by movement of the connecting link 55, and the intermediate rod 53 connected to the intermediate lever 54 is moved in a direction in which the operating mechanism crank lever 52 is pulled by the rotational movement of the intermediate lever 54. The operating mechanism crank lever 52 is rotated around the crankshaft 40 by movement of the intermediate rod 53. The rotational movement of the operating mechanism crank lever 52 is transmitted to the operating-mechanism-side coupling 44 via the rotation shaft 51, and the first crank connecting rod 41 is also rotated similarly.

The first crank lever 16 is rotated by the rotational movement of the first crank connecting rod 41 to induce movement of the first insulating operating rod 15. In the first insulating operating rod 15, one end portion is rotated around the pin coupled to the first crank lever 16, the other end portion is rotated around the pin coupled to the first operating rod 14, and the first operating rod 14 is moved to be pulled to one end side of the first container 11.

The first operating rod 14 is moved by movement of the first insulating operating rod 15, and moved linearly from one end side toward the other end side of the first container 11 in the longitudinal direction of the first container 11. The first movable contact 13 is moved linearly toward one end side of the first container 11 by movement of the first operating rod 14. The first movable contact 13 is separated from the first facing contact 12 by movement of the first movable contact 13.

The rotational movement of the first crank connecting rod 41 is transmitted to the second crank connecting rod 42 through the first coupling 45, and the second crank connecting rod 42 is rotated. The second crank connecting rod 42 starts rotation with a delay from the first crank connecting rod 41 to an extent of a twist of the first crank connecting rod 41, slight meshing of serrations between the first crank connecting rod 41 and the first coupling 45, a twist of the first coupling 45, and a twist of the second crank connecting rod 42. The second crank lever 26, the second insulating operating rod 25, the second operating rod 24, and the second movable contact 23 are moved by rotating the second crank connecting rod 42, and the second movable contact 23 is separated from the second facing contact 22.

The rotational movement of the second crank connecting rod 42 is transmitted to the third crank connecting rod 43 through the second coupling 46, and the third crank connecting rod 43 is rotated. The third crank connecting rod 43 starts rotation with a delay from the second crank connecting rod 42 to an extent of a twist of the second crank connecting rod 42, slight meshing of serrations between the second crank connecting rod 42 and the second coupling 46, a twist of the second coupling 46, and a twist of the third crank connecting rod 43. The third crank lever 36, the third insulating operating rod 35, the third operating rod 34, and the third movable contact 33 are moved by rotating the third crank connecting rod 43, and the third movable contact 33 is separated from the third facing contact 32.

The rotational movement of the third crank connecting rod 43 is transmitted to the shock absorbing mechanism crank lever 61 of the auxiliary shock absorbing mechanism 60 via the shock-absorbing-mechanism-side coupling 47 connected to the third crank connecting rod 43. As shown in FIG. 2, the shock absorbing mechanism crank lever 61 rotates in the rotating direction W counterclockwise about the crankshaft 40 according to the transmitted rotational movement. When the shock absorbing mechanism crank lever 61 rotates in the rotating direction W, the damper roller 62 moves toward the damper head 64 and approaches the damper head 64. The damper roller 62 is engaged with (contacts) the damper head 64 at the end of the operation, and moves the damper head 64 in the direction of the damper cylinder 65 to push the damper head 64 into the damper cylinder 65.

The damper head 64 is integrated with the damper piston 66 provided in the damper cylinder 65. For this reason, when the damper roller 62 pushes the damper head 64 into the damper cylinder 65, the damper piston 66 moves in the oil in the damper cylinder 65, and the damper 63 generates a braking force.

When the damper 63 generates the braking force, the third crank connecting rod 43 that rotates and moves is decelerated. Next, the second crank connecting rod 42 is delayed by the third crank connecting rod 43 and decelerated, and further, the first crank connecting rod 41 is delayed by the second crank connecting rod 42 and decelerated. Finally, the braking force of the shock absorber 57 provided in the operating mechanism 50 is applied via the connecting link 55 to brake the crankshaft 40, and the first movable contact 13, the second movable contact 23, and the third movable contact 33 arrive at the open position and reach the open state.

Next, the results obtained by mechanism analysis of the stroke curve when the first movable contact 13, the second movable contact 23, and the third movable contact 33 move from the closed position to the open position will be described. In the mechanism analysis, the positions of the first movable contact 13, the second movable contact 23, and the third movable contact 33 (hereinafter, "movable contact position") are defined as positions expressed as percentages with their open positions defined as 0% and their closed positions defined as 100%.

Figure 3:
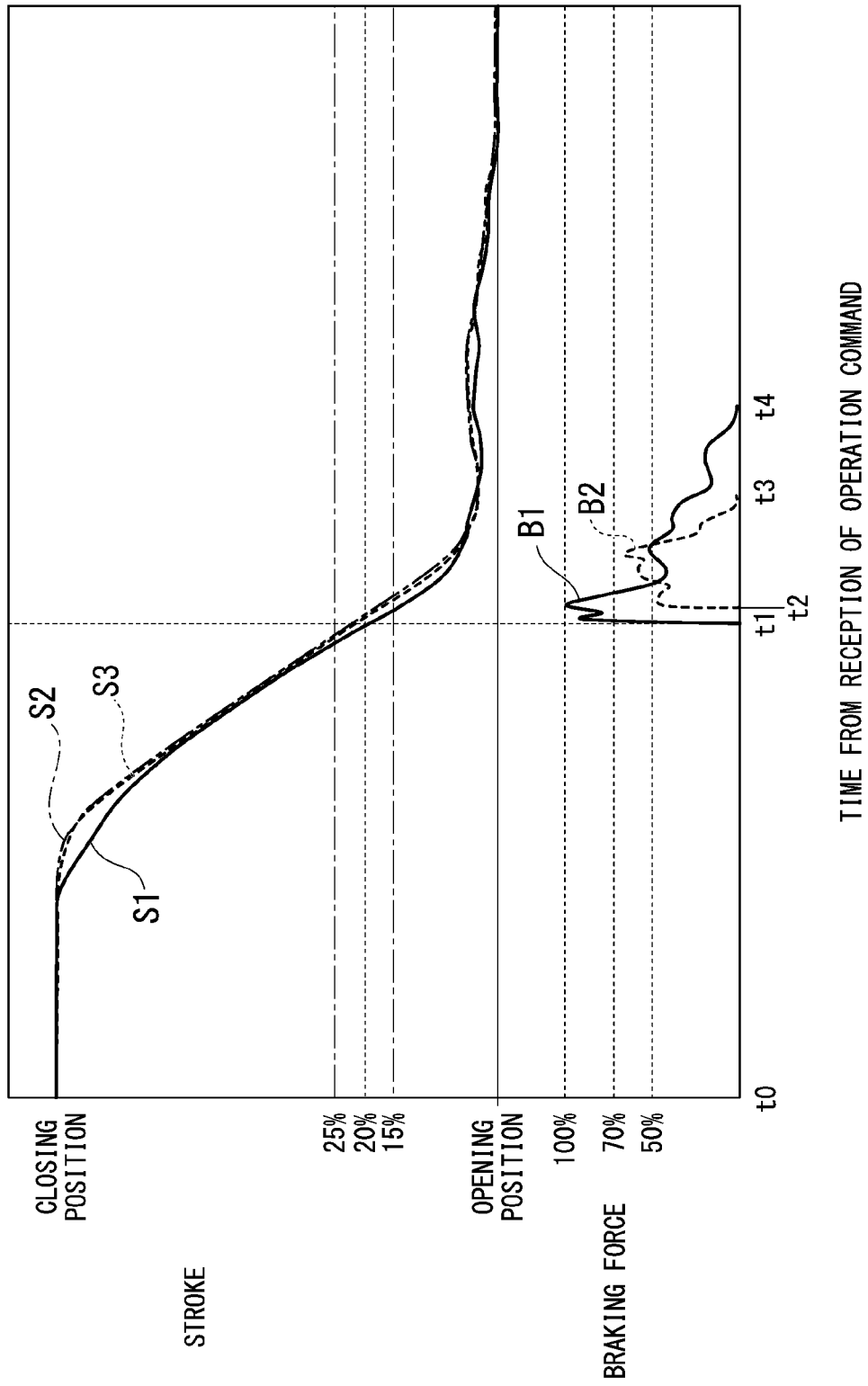
FIG. 3 is a view showing a stroke curve of each movable contact that moves from a closed position to an open position.

FIG. 3 is a view showing a stroke curve of each movable contact when moving from the closed position to the open position. A first stroke curve S1 shows a stroke curve of the first movable contact 13, a second stroke curve S2 shows a stroke curve of the second movable contact 23, and a third stroke curve S3 shows a stroke curve of the third movable contact 33. A command reception time t0 is a time when an operating command output by a control device is received.

In addition, a braking start position is set to a movable contact position. For example, the braking start position is set to an arbitrary movable contact position of 15% or more and 25% or less, and a position of 20% for the mechanism analysis. The braking start position is determined on the basis of, for example, a stroke length of the damper piston 66 in the auxiliary shock absorbing mechanism 60 or a braking force of the shock absorber 57 and the auxiliary shock absorbing mechanism 60.

In the mechanism analysis, it is assumed that the crankshaft 40 is braked by the shock absorber 57 and the auxiliary shock absorbing mechanism 60. FIG. 3 shows a change in time-lapse of the braking force applied to the crankshaft 40 by each of the shock absorber 57 and the auxiliary shock absorbing mechanism 60. A first braking force curve B1 shows a change in time-lapse of the braking force applied to the crankshaft 40 by the shock absorber 57, and a second braking force curve B2 shows a change in time-lapse of the braking force applied to the crankshaft 40 by the auxiliary shock absorbing mechanism 60.

According to the results of the mechanism analysis, it is the first movable contact 13 that reaches the braking start position first between the first movable contact 13 and the third movable contact 33. For this reason, in the shock absorber 57 and the auxiliary shock absorbing mechanism 60, the shock absorber 57 disposed at a position close to the first movable contact 13 starts absorbing of a shock of rotational movement of the crankshaft 40 before the auxiliary shock absorbing mechanism 60 disposed at a position far from the first movable contact 13. For this reason, a braking start timing (hereinafter, "a first braking start timing") t1 when the shock absorber 57 starts braking of the crankshaft 40 is set before a braking start timing (hereinafter, "a second braking start timing") t2 when the auxiliary shock absorbing mechanism 60 starts braking of the crankshaft 40.

The first braking start timing t1 may be set to a timing later than the second braking start timing t2 or the first braking start timing t1 may be set to the same timing as the second braking start timing t2. In particular, when the third movable contact 33 reaches the braking start position first between the first movable contact 13 and the third movable contact 33, the first braking start timing t1 is preferably set to a timing later than the second braking start timing t2.

In the mechanism analysis, a braking force of the shock absorber 57 and the auxiliary shock absorbing mechanism 60 varies as shown by the first braking force curve B1 and the second braking force curve B2 shown in FIG. 3. A braking end timing (hereinafter, "a first braking end timing") t3 when the shock absorber 57 terminates braking of the crankshaft 40 is set to a timing after a braking end timing (hereinafter, "a second braking end timing") t4 when the auxiliary shock absorbing mechanism 60 terminates braking of the crankshaft 40.

The braking force added by the shock absorber 57 is greater than the braking force added by the auxiliary shock absorbing mechanism 60, and the braking force added by the shock absorber 57 mainly causes the crankshaft 40 to brake. The first braking end timing t3 may be set to a timing before the second braking end timing t4 or may be set to the same timing as the first braking end timing t3 and the second braking end timing t4.

According to the mechanism analysis, the braking force added to the crankshaft 40 by the shock absorber 57 and the auxiliary shock absorbing mechanism 60 is about 67% of the case in which a maximum value of a proportion occupied by the braking force added by the shock absorber 57 is 100%, and thus rebound can be preferably suppressed. Considering assembly changes, elastic deformation, or the like of the crankshaft 40, the shock absorber 57, and the auxiliary shock absorbing mechanism 60 in the opening/closing device 1, it is preferable to set the proportion of the braking force added by the shock absorber 57 within a range of 50% to 70%.

Next, in the opening/closing device 1 of the first embodiment, the effect of providing the auxiliary shock absorbing mechanism 60 will be described while considering the difference from the opening/closing device (hereinafter, "a comparing device") that is a comparison object. The comparing device is the opening/closing mechanism obtained by removing the auxiliary shock absorbing mechanism 60 from the opening/closing device 1.

Figure 4:
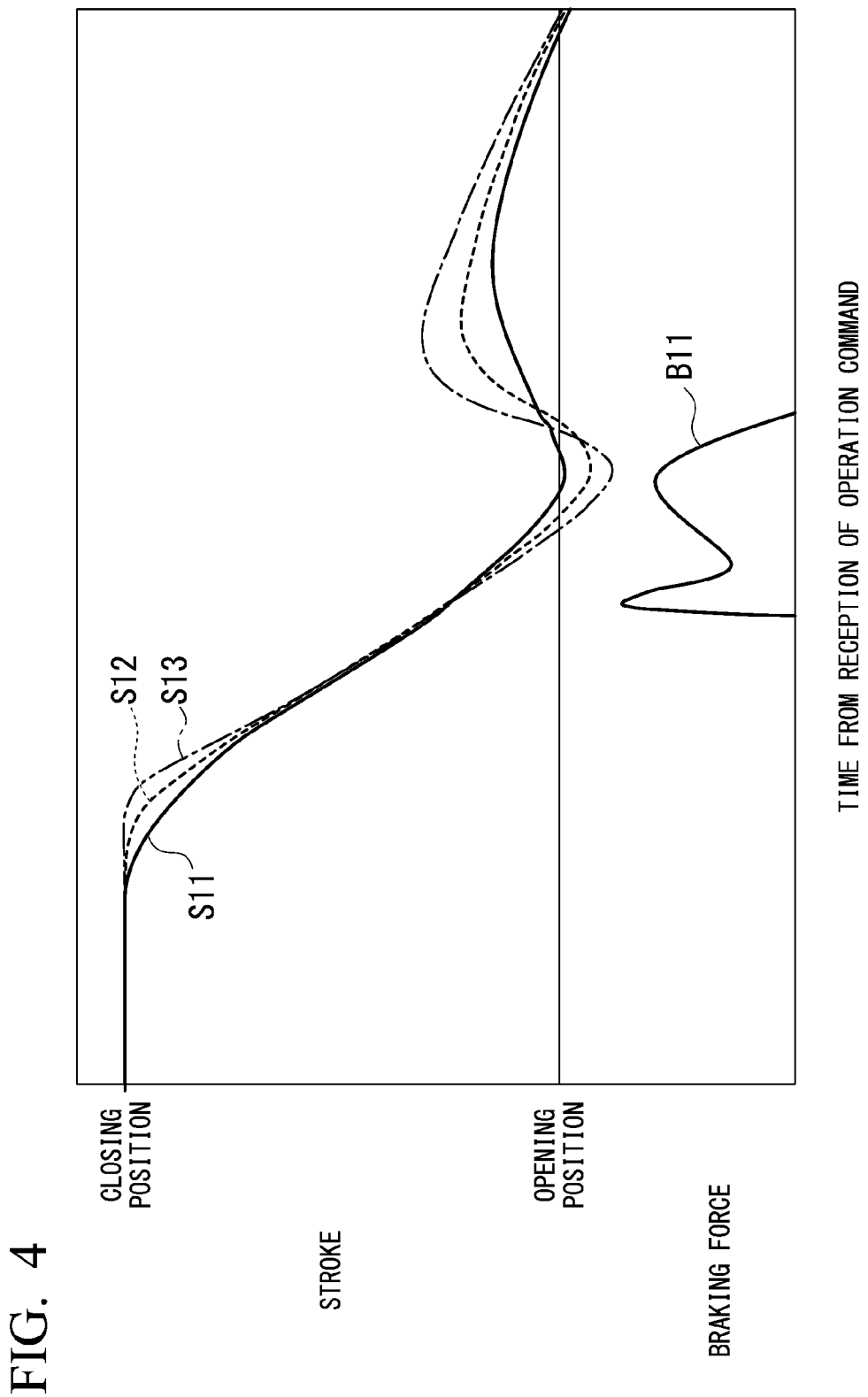
FIG. 4 is a view showing a stroke curve of each movable contact when moving from a closed position to an open position in a comparing device.

FIG. 4 is a view showing a stroke curve of each movable contact when moving from the closed position to the open position in the comparing device. FIG. 4 shows a stroke curve of each movable contact in the comparing device. FIG. 4 shows a change in time-lapse of a braking force added to the crankshaft 40 by the shock absorber 57.

A first stroke curve S11 shows a stroke curve of the first movable contact 13, a second stroke curve S12 shows a stroke curve of the second movable contact 23, and a third stroke curve S13 shows a stroke curve of the third movable contact 33. A braking force curve B11 shows a change in time-lapse of a braking force added to the crankshaft 40 by the shock absorber 57.

In the comparing device, when the crankshaft 40 is rotated by the operating mechanism 50, due to the torsional rigidity generated in the crankshaft 40, a variation occurs in the stroke between the first movable contact 13, the second movable contact 23, and the third movable contact 33 of the crankshaft 40. On the other hand, in the opening/closing device 1, when the auxiliary shock absorbing mechanism 60 is provided, it is possible to obtain a variation reduction effect in the time after the first braking start timing t1 when the variation is especially desired to be suppressed.

Since the auxiliary shock absorbing mechanism 60 is not provided in the comparing device, the braking force added to the crankshaft 40, in particular, the braking force added to the second crank connecting rod 42 and the third crank connecting rod 43 far from the shock absorber 57 may be reduced. In this case, as can be seen from the second stroke curve S12 and the third stroke curve S13 shown in FIG. 4, the second movable contact 23 and the third movable contact 33 connected to the second crank connecting rod 42 and the third crank connecting rod 43, respectively, move beyond the open position to cause an over stroke.

As shown in FIG. 4, a large deviation between the first stroke curve S11, the second stroke curve S12, and the third stroke curve S13 shows that a variation is increased between the first movable contact 13, the second movable contact 23, and the third movable contact 33 upon the opening operation. When the variation is increased between the first movable contact 13, the second movable contact 23, and the third movable contact 33, they are disposed in the first container 11, the second container 21 and the third container 31, respectively, and interlocked to the operations of the first movable contact 13, the second movable contact 23, and the third movable contact 33, respectively, and there is a pressure difference in the compression chamber (not shown) where the capacity is compressed. Accordingly, there is a pressure difference in the compression chamber. When there is a pressure difference in the compression chamber, a blast flow rate of the gas to the electrode (contact) is not stable, and cutoff performance upon the opening operation may be deteriorated.

On the other hand, in the opening/closing device 1, as shown in FIG. 3, none of the first stroke curve S11, the second stroke curve S12, and the third stroke curve S13 exceeds the open position. For this reason, when the auxiliary shock absorbing mechanism 60 is provided, the over stroke is suppressed in any one of the first movable contact 13, the second movable contact 23, and the third movable contact 33.

The insulating medium G sealed in the first container 11, the second container 21, and the third container 31 is, for example, sulfur hexafluoride gas (SF6 gas). On the other hand, in recent years, application of alternative gas such as air, carbon dioxide gas, or the like, is considered as an alternative medium (gas) of SF6. In the opening/closing device 1, when air or carbon dioxide gas is used as the insulating medium G, the pressure difference in the compression chamber appears greatly. This can be described via a general equation of adiabatic compression.

In the equation of the following (1), when an initial pressure is P0 and an initial volume is V0, the current pressure is P and the current volume is V. When the internal volume is changed from the initial pressure P0 to the current pressure P using the piston, it can be expressed by the equation (1) using a ratio of specific heat γ that takes different values depending on the gas.

$$P = P0 \times (V/V0)^{\gamma} \quad (1)$$

As a physical property of a representative medium used in the insulating medium G, a ratio of specific heat γ of SF6 is 1.1, a ratio of specific heat γ of carbon dioxide is 1.3, and a ratio of specific heat γ of air is 1.4. For this reason, a difference in volume is greatly expanded by a multiplier of the ratio of specific heat γ in the carbon dioxide gas, air, or the like, and a difference in capacity of the compression chamber appears greatly in the difference in pressure.

In this respect, in the opening/closing device 1 of the first embodiment, the stroke curves can be aligned between the first movable contact 13, the second movable contact 23, and the third movable contact 33. Accordingly, in the opening operation, the first movable contact 13, the second movable contact 23, and the third movable contact 33 can be stopped accurately at the open position. Further, since the difference in pressure (gas blast pressure) in the compression chamber between the first phase 10, the second phase 20, and the third phase 30 can be reduced, the cutoff performance can be stabilized by matching the blast flow rate of the gas to the electrode (contact).

Further, in the opening/closing device 1 of the first embodiment, the over stroke or rebound of the first movable contact 13, the second movable contact 23, and third movable contact seen in the comparing device shown by the stroke curve shown in FIG. 4 is suppressed. For this reason, a withstanding pressure with respect to a transient recovery voltage can be maintained, and reignition can be suppressed.

Further, in the opening/closing device 1 of the first embodiment, the shock absorber 57 is provided on the side of the first transmission mechanism 18, the auxiliary shock absorbing mechanism 60 is provided on the side of the third transmission mechanism 38, and thus, torsion when the crankshaft 40 is braked is suppressed. Accordingly, mechanical yield strength of the crankshaft 40 can be increased.

Further, in the opening/closing device 1 of the first embodiment, the energy absorbed in the crankshaft 40 is distributed by both the shock absorber 57 and the auxiliary shock absorbing mechanism 60 included in the operating mechanism 50. Accordingly, mechanical yield strength of the first crank connecting rod 41, the second crank connecting rod, and the third crank connecting rod 43 in the crankshaft 40 can be improved.

Second Embodiment

Next, an opening/closing device of a second embodiment will be described. In the second embodiment and subsequent embodiments, the same components as in the first embodiment are designated by the same reference signs and description thereof will be omitted. Since an opening/closing device 2 of the second embodiment is distinguished from the opening/closing device 1 of the first embodiment in mainly a configuration of a crankshaft 70, it will be described focusing on the differences.

Figure 5:
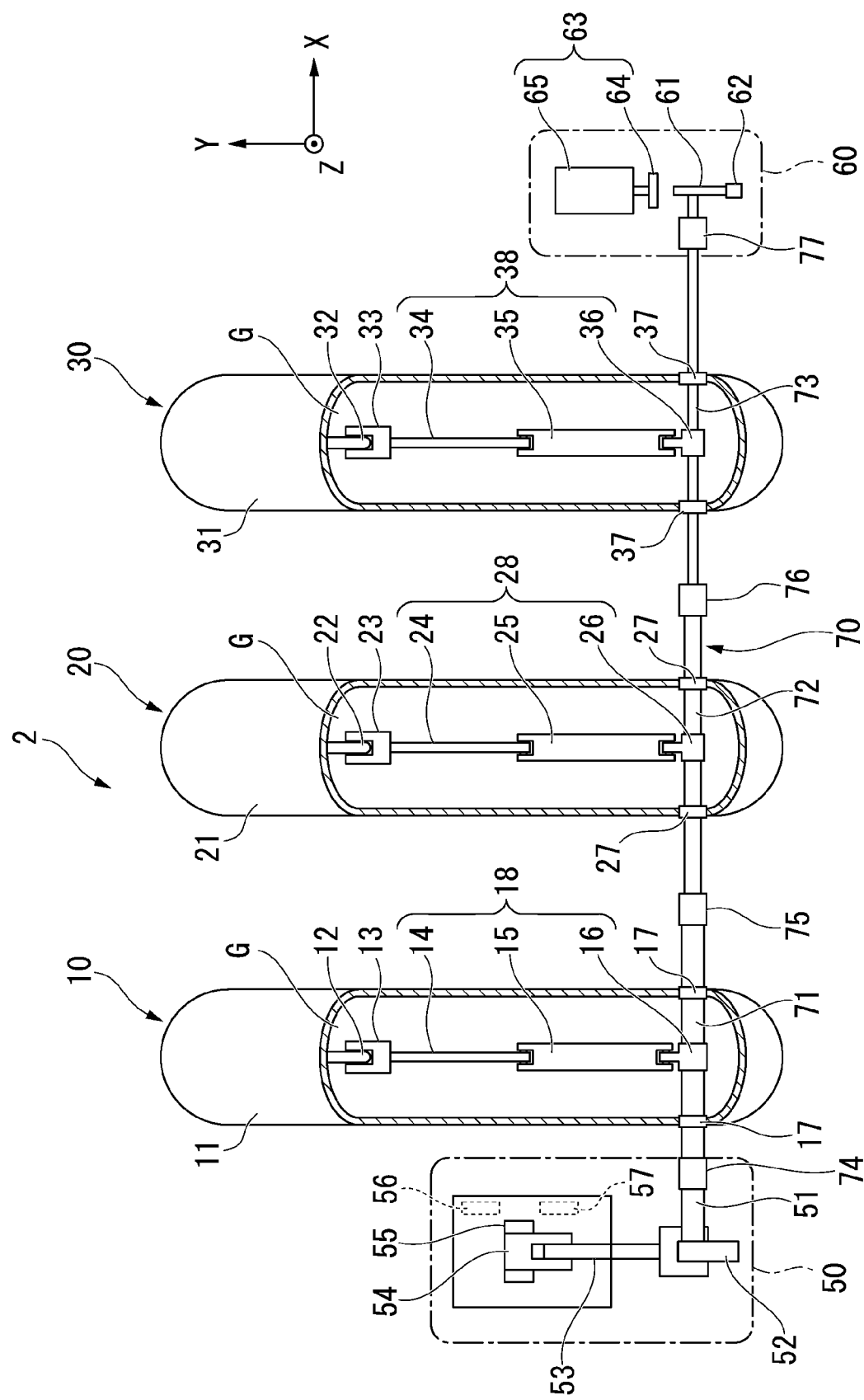
FIG. 5 is a view showing an outline of an opening/closing device according to a second embodiment.

FIG. 5 is a view showing an outline of the opening/closing device 2 of the second embodiment. FIG. 5 shows a state in which the opening/closing device 2 is seen in a plan view. In the opening/closing device 2 of the second embodiment, the crankshaft 70 includes, for example, a first crank connecting rod 71, a second crank connecting rod 72, a third crank connecting rod 73, an operating-mechanism-side coupling 74, a first coupling 75, a second coupling 76, and a shock-absorbing-mechanism-side coupling 77.

The crankshaft 70 operates the first transmission mechanism 18, the second transmission mechanism 28, and the third transmission mechanism 38 and changes the first movable contact 13, the second movable contact 23, and the third movable contact 33 from the closed state to the open state. The first crank connecting rod 71, the second crank connecting rod 72, and the third crank connecting rod 73 are provided to correspond to the first movable contact 13, the second movable contact 23, and the third movable contact 33. All the first crank connecting rod 71, the second crank connecting rod 72, and the third crank connecting rod 73 have elongated members with a fixed size and having substantially the same length.

The first crank connecting rod 71 passes through the first container 11, the second crank connecting rod 72 passes through the second container 21, and the third crank connecting rod 73 passes through the third container 31. The first crank lever 16 is fitted into a longitudinal central portion of the first crank connecting rod 71, the second crank lever 26 is fitted into a longitudinal central portion of the second crank connecting rod 72, and the third crank lever 36 is fitted into a longitudinal central portion of the third crank connecting rod 73.

The operating-mechanism-side coupling 74 is attached to one end side of the first crank connecting rod 71. The other end side of the first crank connecting rod 71 and one end side of the second crank connecting rod 72 are coupled by the first coupling 75, and the other end side of the second crank connecting rod 72 and one end side of the third crank connecting rod 73 are coupled by the second coupling 76. The shock-absorbing-mechanism-side coupling 77 is attached to the other end side of the third crank connecting rod 73.

A geometrical moment of inertia around a rotation axis of the third crank connecting rod 73 is smaller than a geometrical moment of inertia around a rotation axis of the second crank connecting rod 72. A geometrical moment of inertia around the rotation axis of the second crank connecting rod 72 is smaller than a geometrical moment of inertia of a rotation axis of the first crank connecting rod 71.

A more specific structure of the crankshaft 70 will be described. When the first crank connecting rod 71 is provided along the rotation axis and a section modulus is calculated in the X direction, a minimum value thereof is a minimum section modulus (hereinafter, "a first minimum section modulus") Ia of the first crank connecting rod 71. Similarly, a minimum value when the second crank connecting rod 72 is provided along the rotation axis and a section modulus is calculated in the X direction is a minimum section modulus (hereinafter, "a second minimum section modulus") Ib of the second crank connecting rod 72, and a minimum value when the third crank connecting rod 73 is provided along the rotation axis and a section modulus is calculated in the X direction is a minimum section modulus (hereinafter, "a third minimum section modulus") Ic of the third crank connecting rod 73.

In the opening/closing device 2, the first minimum section modulus Ia, the second minimum section modulus Ib, and the third minimum section modulus Ic have a relation shown in the following equation (2). The first minimum section modulus Ia, the second minimum section modulus Ib, and the third minimum section modulus Ic may have a relation shown in the following equation (3) or (4).

$$Ia > Ib > Ic \quad (2)$$

$$Ia \geq Ib > Ic \quad (3)$$

$$Ia > Ib \geq Ic \quad (4)$$

A thickness (an outer diameter) of each of the operating-mechanism-side coupling 74, the first coupling 75, the second coupling 76 is slightly greater than the thicker one of the two connected rods, and they have different thickness between the operating-mechanism-side coupling 74, the first coupling 75, and the second coupling 76. In this case, thicknesses of the operating-mechanism-side coupling 74, the first coupling 75, and the second coupling 76 are reduced in sequence. The operating-mechanism-side coupling 74, the first coupling 75, and the second coupling 76 may have the same thickness.

In the opening/closing device 2 of the second embodiment, the first crank lever 16 rotates with a moment of inertia on the basis of the section modulus of the first crank connecting rod 71 according to rotation of the first crank connecting rod 71. Similarly, the second crank lever 26 rotates with a moment of inertia on the basis of the section modulus of the second crank connecting rod 72 according to rotation of the second crank connecting rod 72, and the third crank lever 36 rotates with a moment of inertia on the basis of the section modulus of the third crank connecting rod 73 according to rotation of the third crank connecting rod 73.

Here, a geometrical moment of inertia around a rotation axis of the third crank connecting rod 73 is smaller than a geometrical moment of inertia around a rotation axis of the second crank connecting rod 72, and a geometrical moment of inertia around the rotation axis of the second crank connecting rod 72 is smaller than a geometrical moment of inertia around a rotation axis of the first crank connecting rod 71. For this reason, a moment of inertia applied to the third crank lever 36 is smaller than a moment of inertia applied to the second crank lever 26, and the moment of inertia applied to the second crank lever 26 is smaller than a moment of inertia applied to the first crank lever 16. Accordingly, a delay with respect to the first crank connecting rod 41 and the second crank connecting rod 42 when the second crank connecting rod 42 and the third crank connecting rod 43 start to rotate can be reduced. Further, while a rotational torque to an extent of three phases is applied to the first crank connecting rod 41 closer to the operating mechanism 50, since a moment of inertia applied to the third crank lever 36 connected to the third crank connecting rod 43 closer to the auxiliary shock absorbing mechanism 60 is reduced, a rotational torque applied by the third crank connecting rod 43 can be reduced.

Third Embodiment

Next, an opening/closing device of a third embodiment will be described. Since the opening/closing device of the third embodiment is distinguished from the opening/closing device 1 of the first embodiment mainly in a configuration of the auxiliary shock absorbing mechanism 60, it will be described focusing on differences thereof.

Figure 6:
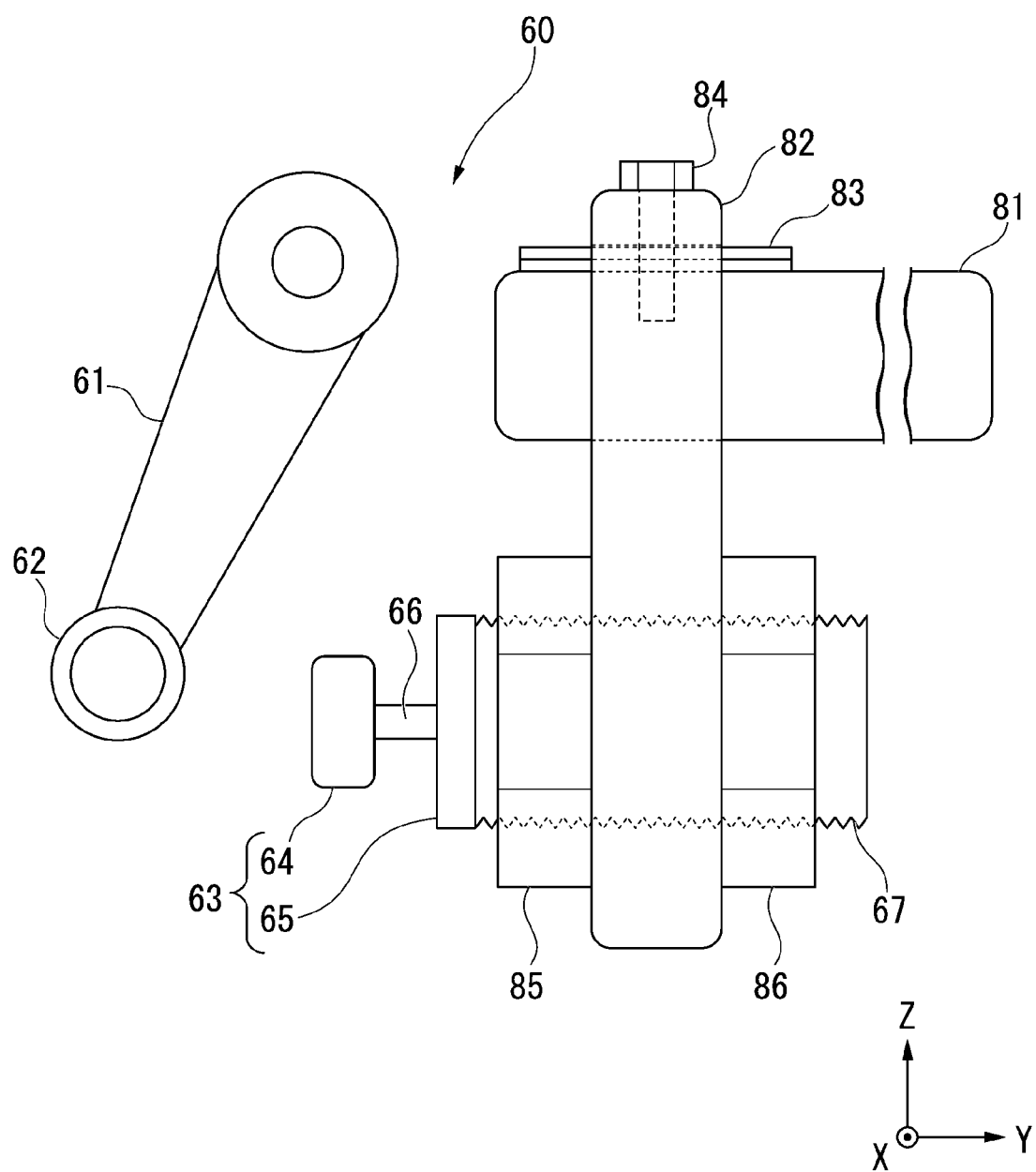
FIG. 6 is a view showing an outline of an auxiliary shock absorbing mechanism of an opening/closing device of a third embodiment.

FIG. 6 is a view showing an outline of the auxiliary shock absorbing mechanism 60 of the opening/closing device of the third embodiment. Like the first embodiment, the auxiliary shock absorbing mechanism 60 of the opening/closing device of the third embodiment includes the shock absorbing mechanism crank lever 61, the damper roller 62, and the damper 63. The damper 63 includes the damper head 64, the damper cylinder 65, and the damper piston 66. These points are common to the first embodiment.

The auxiliary shock absorbing mechanism 60 further includes a frame 81, an auxiliary shock absorbing mechanism support 82, a spacer 83, a fixing bolt 84, a first nut 85, and a second nut 86. The frame 81 is fixedly disposed above the damper cylinder 65. The frame 81 maintains a relative positional relation to the crankshaft 40.

The auxiliary shock absorbing mechanism support 82 is suspended from the frame 81. The spacer 83 is interposed between the frame 81 and the auxiliary shock absorbing mechanism support 82. The auxiliary shock absorbing mechanism support 82 is fixed to the frame 81 using the fixing bolt 84 with the spacer 83 sandwiched therebetween. A width between the auxiliary shock absorbing mechanism support 82 and the frame 81 can be adjusted by a thickness of the spacer 83 interposed therebetween, the number of spacers, or the like. For example, the spacer 83 is provided to adjust a relative height positional relation of the damper 63 with respect to the damper roller 62. The spacer 83 is an example of the position adjusting mechanism.

A piercing hole through which the damper cylinder 65 passes is formed in a lower portion of the auxiliary shock absorbing mechanism support 82. The first nut 85 and the second nut 86 are fixed to front and rear positions of the piercing hole, respectively. Opening portions of the first nut 85 and the second nut 86 are disposed coaxially with the piercing hole of the auxiliary shock absorbing mechanism support 82.

A threaded portion 67 engaged with the first nut 85 and the second nut 86 is provided on a side surface of the damper cylinder 65. The damper cylinder 65 passes through the piercing hole formed in the auxiliary shock absorbing mechanism support 82 and is screwed into the first nut 85 and the second nut 86, and thus, the damper 63 is supported by and fixed to the auxiliary shock absorbing mechanism support 82. The auxiliary shock absorbing mechanism support 82, the first nut 85, and the second nut 86 are an example of the support member that supports the damper 63.

When the damper cylinder 65 screwed into the first nut 85 and the second nut 86 is rotated, the threaded portion 67 moves along the first nut 85 and the second nut 86, and the damper cylinder 65 advances or retreats according to movement of the threaded portion 67. The threaded portion 67 is provided to engage with teeth provided on the first nut 85 and the second nut 86 and adjust a relative positional relation of the damper 63 with respect to the damper roller 62. The teeth engaged with the threaded portion 67 may be provided on the first nut 85 and the second nut 86. For example, the teeth engaged with the threaded portion 67 may be provided in the piercing hole of the auxiliary shock absorbing mechanism support 82. The threaded portion 67 is an example of the position adjusting mechanism.

In the opening/closing device of the third embodiment, as the shock absorbing mechanism crank lever 61 rotates during the opening operation, the damper roller 62 approaches the damper head 64 of the damper 63, and eventually, the damper roller 62 comes into contact with the damper head 64. When the damper roller 62 comes into contact with the damper head 64, the damper piston 66 provided in the damper cylinder 65 and connected to the damper head 64 moves in the oil to achieve dissipation of the energy. The damper cylinder 65 is firmly fastened by the threaded portion 67 and the first nut 85 and the second nut 86, and thus, the reaction force of the braking force is supported and received by the frame 81 via the auxiliary shock absorbing mechanism support 82.

In the opening/closing device of the third embodiment, the auxiliary shock absorbing mechanism 60 includes the first nut 85 and the second nut 86, and the threaded portion 67 is provided on a side surface of the damper cylinder 65. For this reason, a position of the damper 63 with respect to the damper roller 62 can be easily adjusted by relatively rotating the damper cylinder 65 with respect to the first nut 85 and the second nut 86. In this case, the first nut 85 and the second nut 86 may not be provided.

Further, in the opening/closing device of the third embodiment, the auxiliary shock absorbing mechanism 60 includes the spacer 83 interposed between the frame 81 and the auxiliary shock absorbing mechanism support 82. A height position of the damper 63 supported by the auxiliary shock absorbing mechanism support 82 can be changed by changing the thickness or the number of the spacers 83 and adjusting the width between the frame 81 and the auxiliary shock absorbing mechanism support 82. However, the position of the damper cylinder 65 (the damper 63) with respect to the damper roller 62 can be adjusted by adjusting the thickness or the like of the spacer 83. The timing when the damper roller 62 and the damper head 64 come in contact with each other can be adjusted by adjusting the position of the damper 63 with respect to the damper roller 62.

Further, adjustment of the position of the damper 63 with respect to the damper roller 62 can be executed by providing the spacers 83 with different thicknesses or adjusting the number of the spacers 83. Accordingly, errors caused by manufacturing and assembly can be easily adjusted to generate appropriate braking position and braking force.

Further, the auxiliary shock absorbing mechanism support 82 through which the damper cylinder 65 passes in the damper 63 is sandwiched between the first nut 85 and the second nut 86 from the front and rear. For this reason, the damper cylinder 65 can be strongly fixed as a whole. For this reason, the position of the damper 63 supported by the auxiliary shock absorbing mechanism support 82 is stabilized, and the energy transmitted to the damper 63 via the damper roller 62 when the crankshaft 40 is braked can be reliably absorbed.

Fourth Embodiment

Next, an opening/closing device of a third embodiment will be described. Since the opening/closing device of the fourth embodiment is distinguished from the opening/closing device 1 of the first embodiment mainly in a configuration of the auxiliary shock absorbing mechanism 60, it will be described focusing on differences thereof.

Figure 7:
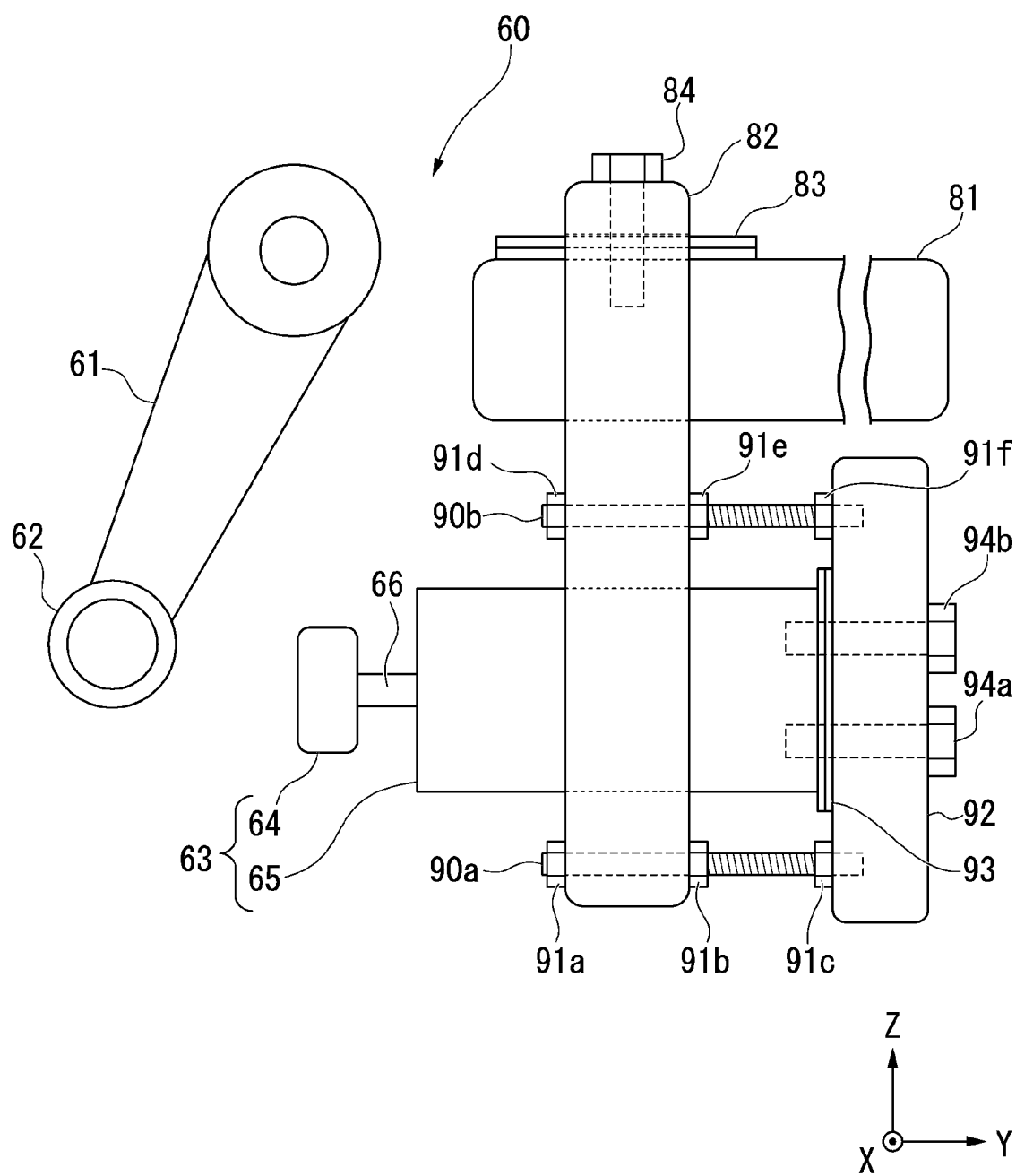
FIG. 7 is a view showing an outline of an auxiliary shock absorbing mechanism of an opening/closing device of a fourth embodiment.

FIG. 7 is a view showing an outline of the auxiliary shock absorbing mechanism 60 of the opening/closing device of the fourth embodiment. Like the first embodiment, the auxiliary shock absorbing mechanism 60 of the opening/closing device of the fourth embodiment includes the shock absorbing mechanism crank lever 61, the damper roller 62, and the damper 63. The damper 63 includes the damper head 64, the damper cylinder 65, the damper piston 66, the frame 81, the auxiliary shock absorbing mechanism support 82, the spacer 83, and the fixing bolt 84. These points are common to the third embodiment.

The auxiliary shock absorbing mechanism 60 further includes a lower stud 90a, an upper stud 90b, a first lower nut 91a, a second lower nut 91b, a third lower nut 91c, a first upper nut 91d, a second upper nut 91e, a third upper nut 91f, a fixing plate 92, a lower spacer 93, a lower fixing bolt 94a, and an upper fixing bolt 94b.

The fixing plate 92 is disposed below the auxiliary shock absorbing mechanism support 82 and in front of the damper cylinder 65. The fixing plate 92 is connected to the auxiliary shock absorbing mechanism support 82 via the lower stud 90a below the damper cylinder 65 and via the upper stud 90b above the damper cylinder 65.

The lower stud 90a is fixed to be sandwiched between the first lower nut 91a and the second lower nut 91b. The lower stud 90a is further inserted into the fixing plate 92 and fixed with the third lower nut 91c. The upper stud 90b is fixed to be sandwiched between the first upper nut 91d and the second upper nut 91e. The upper stud 90b is further inserted into the fixing plate 92 and fixed with the third upper nut 91f. The lower stud 90a and the upper stud 90b are fixed by nuts 91a to 91f, and can adjust a position of the fixing plate 92 with respect to the auxiliary shock absorbing mechanism support 82 in the Y direction and further a position of the fixing plate 92 with respect to the damper cylinder 65 in the Y direction.

The lower spacer 93 is interposed between the damper cylinder 65 and the fixing plate 92. A width between the damper cylinder 65 and the fixing plate 92 can be adjusted by the thickness or the number of the interposed lower spacers 93. For example, the lower spacer 93 is provided to adjust a positional relation of the damper 63 with respect to the damper roller 62 in a relative forward/rearward direction. The lower spacer 93 is an example of the position adjusting mechanism.

In the opening/closing device of the fourth embodiment, the auxiliary shock absorbing mechanism 60 includes the fixing plate 92 disposed in front of the damper cylinder 65. When a braking force is added to the crankshaft 40, a reaction force of the braking force is generated in the damper cylinder 65. The generated reaction force acts on the fixing plate 92 disposed in front of the damper cylinder 65. The fixing plate 92 is connected to the auxiliary shock absorbing mechanism support 82 by the lower stud 90a and the upper stud 90b. For this reason, the reaction force generated in the damper cylinder 65 is transmitted to the auxiliary shock absorbing mechanism support 82 via the fixing plate 92. Accordingly, the reaction force generated in the damper cylinder 65 can be reliably absorbed.

In the opening/closing device of the fourth embodiment, the auxiliary shock absorbing mechanism 60 includes the lower spacer 93 interposed between the damper cylinder 65 and the fixing plate 92. It is possible to change a position of the damper 63 supported by the auxiliary shock absorbing mechanism support 82 in the forward/rearward direction by changing the thickness or the number of the lower spacers 93 or changing the width between the damper cylinder 65 and the fixing plate 92. Accordingly, it is possible to adjust the position of the damper 63 with respect to the damper roller 62 by adjusting the thickness or the like of the lower spacers 93. It is possible to adjust the timing when the damper roller 62 and the damper head 64 come in contact with each other by adjusting the position of the damper 63 with respect to the damper roller 62.

Further, adjustment of the position of the damper 63 with respect to the damper roller 62 can be executed by providing the lower spacers 93 with different thicknesses and adjusting the number of the lower spacers 93. Accordingly, it is possible to generate appropriate braking position and braking force by simply adjusting errors generated due to manufacture or assembly.

In the opening/closing device of the fourth embodiment, in order to adjust the position of the damper 63 with respect to the damper roller 62, the lower spacer 93 is used instead of providing the threaded portions 67 in the side surfaces of the first nut 85, the second nut 86, and the damper cylinder 65 shown in the third embodiment. For this reason, it is possible to improve assemblability when the auxiliary shock absorbing mechanism 60 is assembled.

In each of the above-mentioned embodiments, in the auxiliary shock absorbing mechanism 60, when the crankshaft 40 performs the closing operation, a return spring configured to add a biasing force to the crankshaft 40 may be provided. The return spring is provided in the auxiliary shock absorbing mechanism 60, for example, it becomes an assist for the start of the closing operation by making the force of the return spring sufficiently strong, and thus, it is possible to reduce the variations of the first movable contact 13, the second movable contact 23, and the third movable contact 33 in the closing stroke.

In addition, in each of the above-mentioned embodiments, while the built-in spring 56 in the operating mechanism 50 functions as a power source to add power to the crankshaft 40, a driving source or the like other than the built-in spring 56 may become a power source and power may be added to the crankshaft 40. For example, the driving source of the operating mechanism 50 may use an electromagnetic force including a hydraulic pressure, linear driving, and motor driving.

In addition, in each of the above-mentioned embodiments, while the oil damper is used as the damper 63 that is a shock absorbing member, the shock absorbing member is not the oil damper, and for example, may be a gas damper, may be an electromagnetic mechanism, or may be a rotation damper or the like. In addition, each part such as an operating rod, an insulating operating rod, or the like, in the transmission mechanism is not limited to be constituted by one part, but may be constituted by a plurality of parts by appropriately integrating them. For example, the transmission mechanism may be a four-joint type instead of a three-joint type.

In addition, in each of the above-mentioned embodiments, the first movable contact 13, the second movable contact 23, and the third movable contact 33 form a concave shape, and the first facing contact 12, the second facing contact 22, and the third facing contact 32 form a convex type. Shapes of the movable contact and the facing contact may be a shape other than the shape described above, in which each contact can come into contact at the time of closing. For example, the movable contact may have a convex shape, the facing contact may be a concave shape, and the movable contact and the facing contact may have any one planar shape.

In addition, in each of the above-mentioned embodiments, while the crankshaft 40 couples the first crank connecting rod 41, the second crank connecting rod 42, and the third crank connecting rod 43 using the first coupling 45 and the second coupling 46, the crankshaft may be constituted by one, two, or four rods, or more. In the case in which the crankshaft is constituted by one rod, for example, like the second embodiment, when a magnitude of a geometrical moment of inertia of the crank connecting rod corresponding to each of the first phase 10, the second phase 20, and the third phase 30 is changed, a stepped rod to which columnar bodies with different diameters are connected may be used. Alternatively, the crankshaft may be constituted by a rod with a tendency where a geometrical moment of inertia around a rotation axis of the crankshaft is reduced as it is located far from the operating mechanism 50, for example, a rod with a taper where a diameter is reduced as it moves away from the operating mechanism 50.

While "tending to be reduced" means, for example, that it tends to be reduced in addition to the aspect that it is uniformly reduced, in part of the middle, there is a part that it becomes larger, but it also includes an aspect that it becomes smaller as a whole. While "tending to be reduced" means, for example, an aspect in which the geometrical moment of inertia around the rotation axis of the crankshaft is gradually reduced as it is located far from the operating mechanism 50, or a point as a protrusion where the geometrical moment of inertia is increased at a point partial distant from the operating mechanism 50 at a position separated from a position to which a part of the crankshaft, in particular, the crank lever is attached, it includes the crankshaft that is reduced as it is separated from the operating mechanism 50 as a whole.

In addition, in each of the above-mentioned embodiments, while the operating-mechanism-side coupling 44 configured to couple the operating mechanism 50 and the crankshaft 40 is used, the crankshaft 40 may be directly coupled to the operating mechanism 50, for example, the rotation shaft 51 without using the operating-mechanism-side coupling 44. Similarly, while the shock-absorbing-mechanism-side coupling 47 configured to couple the auxiliary shock absorbing mechanism 60 and the crankshaft 40 is used, the crankshaft 40 may be directly coupled to the auxiliary shock absorbing mechanism 60, for example, the shock absorbing mechanism crank lever 61 without using the shock-absorbing-mechanism-side coupling 47.

In addition, in each of the above-mentioned embodiments, while the auxiliary shock absorbing mechanism 60 is disposed on an outer side of the third transmission mechanism 38 (a right side in the X direction), it may be provided at any position as long as it is provided closer to the third transmission mechanism 38 than the operating mechanism 50. For example, the auxiliary shock absorbing mechanism 60 may be disposed between the second transmission mechanism 28 and the third transmission mechanism 38. In addition, the components in each embodiment may be appropriately combined.

According to at least one embodiment as described above, by providing a first movable contact accommodated in a first container, a first transmission mechanism connected to the first movable contact, the first container configured to accommodate at least the first movable contact, a second movable contact accommodated in a second container, a second transmission mechanism connected to the second movable contact, the second container configured to accommodate at least the second movable contact and arranged with the first container, a third movable contact accommodated in a third container, a third transmission mechanism connected to the third movable contact, the third container configured to accommodate at least the third movable contact and aligned with the second container, a crankshaft configured to operate the first transmission mechanism, the second transmission mechanism, and the third transmission mechanism and change the first movable contact, the second movable contact, and the third movable contact from a closed state to an open state, an operating mechanism disposed on the side of the first transmission mechanism and configured to rotate the crankshaft, and a shock absorbing mechanism disposed on the side of the third transmission mechanism and configured to absorb a shock of rotational movement of the crankshaft, the plurality of movable contacts can be accurately stopped at the open position in the opening operation.

While some embodiments of the present invention have been described, these embodiments are provided as examples and are not intended to limit the scope of the present invention. These embodiments can be implemented in various other forms, and various omissions, replacements, and modifications may be made without departing from the spirit of the present invention. These embodiments or their modifications are included in the scope or spirit of the present invention, as well as the scope of the present invention described in the claims and their equivalents.

What is claimed is:

1. An opening/closing device comprising:
a first movable contact accommodated in a first container;
a first transmission mechanism connected to the first movable contact;
the first container configured to accommodate at least the first movable contact;
a second movable contact accommodated in a second container;
a second transmission mechanism connected to the second movable contact;
the second container configured to accommodate at least the second movable contact and aligned with the first container;
a third movable contact accommodated in a third container;
a third transmission mechanism connected to the third movable contact;
the third container configured to accommodate at least the third movable contact and aligned with the second container;
a crankshaft configured to operate the first transmission mechanism, the second transmission mechanism, and the third transmission mechanism and change the first movable contact, the second movable contact, and the third movable contact from a closed state to an open state;
an operating mechanism disposed on a side of the first transmission mechanism and configured to rotate the crankshaft; and
a shock absorbing mechanism disposed on a side of the third transmission mechanism and configured to absorb a shock of rotational movement of the crankshaft by stopping movement in a rotating direction of a shock absorbing mechanism crank lever rotating in a same direction as a rotating direction of the crankshaft.

2. The opening/closing device according to claim 1, wherein:
the first transmission mechanism includes:
a first operating rod connected to the first movable contact;
a first crank lever connected to the crankshaft and rotated according to rotation of the crankshaft; and
a first insulating operating rod configured to convert rotational movement of the first crank lever into movement of the first operating rod,
the second transmission mechanism includes:
a second operating rod connected to the second movable contact;
a second crank lever connected to the crankshaft and rotated according to rotation of the crankshaft; and
a second insulating operating rod configured to convert rotational movement of the second crank lever into movement of the second operating rod, and
the third transmission mechanism includes:
a third operating rod connected to the third movable contact;
a third crank lever connected to the crankshaft and rotated according to rotation of the crankshaft; and
a third insulating operating rod configured to convert rotational movement of the third crank lever into movement of the third operating rod.

3. The opening/closing device according to claim 1, further comprising a position adjusting mechanism configured to adjust a position of the shock absorbing mechanism.

4. An opening/closing device comprising:
a first movable contact accommodated in a first container;
a first transmission mechanism connected to the first movable contact;
the first container configured to accommodate at least the first movable contact;
a second movable contact accommodated in a second container;
a second transmission mechanism connected to the second movable contact;
the second container configured to accommodate at least the second movable contact and aligned with the first container;
a third movable contact accommodated in a third container;
a third transmission mechanism connected to the third movable contact;
the third container configured to accommodate at least the third movable contact and aligned with the second container;
a crankshaft configured to operate the first transmission mechanism, the second transmission mechanism, and the third transmission mechanism and change the first movable contact, the second movable contact, and the third movable contact from a closed state to an open state;
an operating mechanism disposed on a side of the first transmission mechanism and configured to rotate the crankshaft; and
a shock absorbing mechanism disposed on a side of the third transmission mechanism and configured to absorb a shock of rotational movement of the crankshaft,
wherein:
the crankshaft includes a first crank connecting rod, a second crank connecting rod, and a third crank connecting rod provided to correspond to the first movable contact, the second movable contact, and the third movable contact, respectively, and each having a fixed thickness,
the first crank connecting rod and the second crank connecting rod are connected via a first coupling, and the second crank connecting rod and the third crank connecting rod are connected via a second coupling, and
a geometrical moment of inertia around a rotation axis of the third crank connecting rod is smaller than a geometrical moment of inertia around a rotation axis of the second crank connecting rod, and the geometrical moment of inertia around the rotation axis of the second crank connecting rod is smaller than a geometrical moment of inertia around a rotation axis of the first crank connecting rod.

5. An opening/closing device comprising:
a first movable contact accommodated in a first container;
a first transmission mechanism connected to the first movable contact;
the first container configured to accommodate at least the first movable contact;
a second movable contact accommodated in a second container;
a second transmission mechanism connected to the second movable contact;
the second container configured to accommodate at least the second movable contact and aligned with the first container;
a third movable contact accommodated in a third container;
a third transmission mechanism connected to the third movable contact;
the third container configured to accommodate at least the third movable contact and aligned with the second container;
a crankshaft configured to operate the first transmission mechanism, the second transmission mechanism, and the third transmission mechanism and change the first movable contact, the second movable contact, and the third movable contact from a closed state to an open state;
an operating mechanism disposed on a side of the first transmission mechanism and configured to rotate the crankshaft; and
a shock absorbing mechanism disposed on a side of the third transmission mechanism and configured to absorb a shock of rotational movement of the crankshaft,
wherein a geometrical moment of inertia around a rotation axis of the crankshaft tends to be reduced as the crankshaft extends away from the operating mechanism.

6. An opening/closing device comprising:
a first movable contact accommodated in a first container;
a first transmission mechanism connected to the first movable contact;
the first container configured to accommodate at least the first movable contact;
a second movable contact accommodated in a second container;
a second transmission mechanism connected to the second movable contact;
the second container configured to accommodate at least the second movable contact and aligned with the first container;
a third movable contact accommodated in a third container;

a third transmission mechanism connected to the third movable contact;
the third container configured to accommodate at least the third movable contact and aligned with the second container;
a crankshaft configured to operate the first transmission mechanism, the second transmission mechanism, and the third transmission mechanism and change the first movable contact, the second movable contact, and the third movable contact from a closed state to an open state;
an operating mechanism disposed on a side of the first transmission mechanism and configured to rotate the crankshaft; and
a shock absorbing mechanism disposed on a side of the third transmission mechanism and configured to absorb a shock of rotational movement of the crankshaft,
further comprising a position adjusting mechanism configured to adjust a position of the shock absorbing mechanism,
wherein the shock absorbing mechanism further includes:
    a roller member provided on the crankshaft and rotated according to rotation of the crankshaft;
    a shock absorbing member configured to come into contact with the roller member and absorb energy by rotational movement of the crankshaft; and
    a support member configured to support the shock absorbing member, and
    the position adjusting mechanism includes a threaded portion engaged with teeth provided on the support member and configured to adjust a relative positional relation of the shock absorbing member with respect to the roller member.

7. An opening/closing device comprising:
a first movable contact accommodated in a first container;
a first transmission mechanism connected to the first movable contact;
the first container configured to accommodate at least the first movable contact;
a second movable contact accommodated in a second container;
a second transmission mechanism connected to the second movable contact;
the second container configured to accommodate at least the second movable contact and aligned with the first container;
a third movable contact accommodated in a third container;
a third transmission mechanism connected to the third movable contact;
the third container configured to accommodate at least the third movable contact and aligned with the second container;
a crankshaft configured to operate the first transmission mechanism, the second transmission mechanism, and the third transmission mechanism and change the first movable contact, the second movable contact, and the third movable contact from a closed state to an open state;
an operating mechanism disposed on a side of the first transmission mechanism and configured to rotate the crankshaft; and
a shock absorbing mechanism disposed on a side of the third transmission mechanism and configured to absorb a shock of rotational movement of the crankshaft,
further comprising a position adjusting mechanism configured to adjust a position of the shock absorbing mechanism,
wherein the shock absorbing mechanism further includes:
    a roller member provided on the crankshaft and rotated according to rotation of the crankshaft;
    a shock absorbing member configured to come into contact with the roller member and absorb energy by rotational movement of the crankshaft;
    a support member configured to support the shock absorbing member; and
    a frame on which a relative positional relation with respect to the crankshaft is held and to which the support member is fixed, and
    the position adjusting mechanism includes a spacer interposed either between the support member and the frame or between the support member and the shock absorbing member and which adjusts a relative positional relation of the shock absorbing member with respect to the roller member.

8. An opening/closing device comprising:
a first movable contact accommodated in a first container;
a first transmission mechanism connected to the first movable contact;
the first container configured to accommodate at least the first movable contact;
a second movable contact accommodated in a second container;
a second transmission mechanism connected to the second movable contact;
the second container configured to accommodate at least the second movable contact and aligned with the first container;
a third movable contact accommodated in a third container;
a third transmission mechanism connected to the third movable contact;
the third container configured to accommodate at least the third movable contact and aligned with the second container;
a crankshaft configured to operate the first transmission mechanism, the second transmission mechanism, and the third transmission mechanism and change the first movable contact, the second movable contact, and the third movable contact from a closed state to an open state;
an operating mechanism disposed on a side of the first transmission mechanism and configured to rotate the crankshaft; and
a shock absorbing mechanism disposed on a side of the third transmission mechanism and configured to absorb a shock of rotational movement of the crankshaft,
wherein the operating mechanism includes:
    a power source configured to supply power to the crankshaft; and
    a shock absorber configured to absorb the shock of rotational movement of the crankshaft, and
    when movable contact positions of the first movable contact, the second movable contact, and the third movable contact expressed as a percentage with an open position as 0% and a closed position as 100% of the first movable contact, the second movable contact, and the third movable contact in an opening operation in which the first movable contact, the second movable contact, and the third movable contact are changed from the closed state to the open state are defined, an arbitrary movable contact position of 15% or more and 25% or less is set to a braking start position of the crankshaft by the shock absorber.

9. The opening/closing device according to claim 8, wherein one of the shock absorber and the shock absorbing mechanism disposed at a position close to the movable contact reaching the braking start position in advance between the first movable contact and the third movable contact starts to absorb the shock of rotational movement of the crankshaft before the other disposed at a far position.

10. An opening/closing device comprising:
a first movable contact accommodated in a first container;
a first transmission mechanism connected to the first movable contact;
the first container configured to accommodate at least the first movable contact;
a second movable contact accommodated in a second container;
a second transmission mechanism connected to the second movable contact;
the second container configured to accommodate at least the second movable contact and aligned with the first container;
a third movable contact accommodated in a third container;
a third transmission mechanism connected to the third movable contact;
the third container configured to accommodate at least the third movable contact and aligned with the second container;
a crankshaft configured to operate the first transmission mechanism, the second transmission mechanism, and the third transmission mechanism and change the first movable contact, the second movable contact, and the third movable contact from a closed state to an open state;
an operating mechanism disposed on a side of the first transmission mechanism and configured to rotate the crankshaft; and
a shock absorbing mechanism disposed on a side of the third transmission mechanism and configured to absorb a shock of rotational movement of the crankshaft,
wherein the operating mechanism includes:
a power source configured to supply power to the crankshaft; and
a shock absorber configured to absorb the shock of rotational movement of the crankshaft, and
a maximum value of a braking force of the shock absorber is 50% or more and 70% or less of a maximum value of a braking force of the shock absorbing mechanism.

* * * * *